Figure 1:
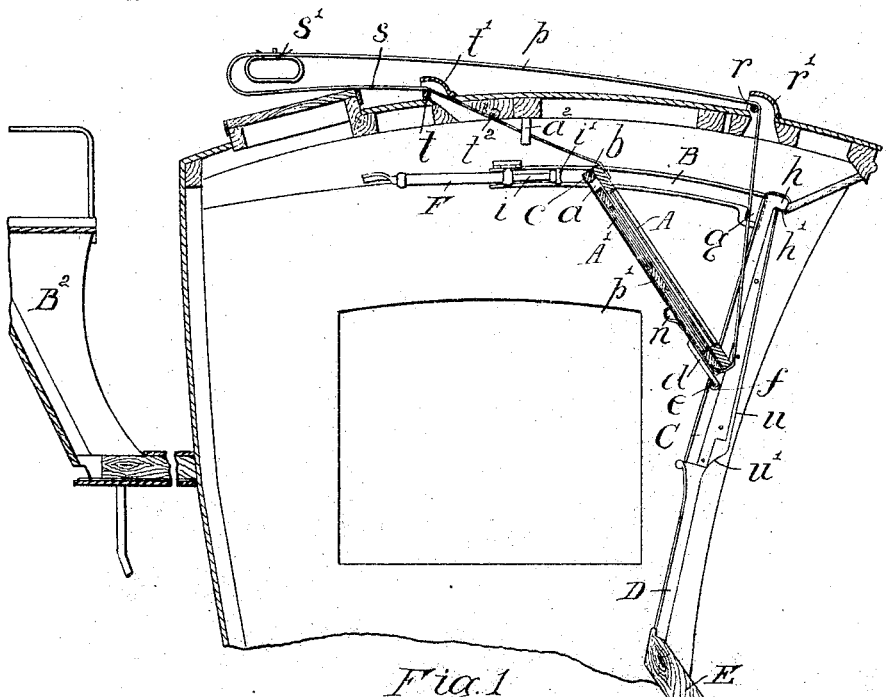

No. 765,467. PATENTED JULY 19, 1904.
P. FORDER.
FRONT LIGHT FOR HANSOM CABS.
APPLICATION FILED JUNE 24, 1903.
NO MODEL. 4 SHEETS—SHEET 1.

WITNESSES
INVENTOR
Percy Forder
BY
ATTORNEY

No. 765,467. PATENTED JULY 19, 1904.
P. FORDER.
FRONT LIGHT FOR HANSOM CABS.
APPLICATION FILED JUNE 24, 1903.
NO MODEL. 4 SHEETS—SHEET 2.

WITNESSES
J. G. Cornett
William J. Firth

INVENTOR
Percy Forder
BY
Henry Cornett
ATTORNEY

No. 765,467. PATENTED JULY 19, 1904.
P. FORDER.
FRONT LIGHT FOR HANSOM CABS.
APPLICATION FILED JUNE 24, 1903.
NO MODEL. 4 SHEETS—SHEET 3.

WITNESSES
INVENTOR
BY
ATTORNEY

No. 765,467. PATENTED JULY 19, 1904.
P. FORDER.
FRONT LIGHT FOR HANSOM CABS.
APPLICATION FILED JUNE 24, 1903.
NO MODEL. 4 SHEETS—SHEET 4.

WITNESSES
INVENTOR
Percy Forder
BY
Henry Connett
ATTORNEY

No. 765,467. Patented July 19, 1904.

UNITED STATES PATENT OFFICE.

PERCY FORDER, OF WOLVERHAMPTON, ENGLAND.

FRONT LIGHT FOR HANSOM-CABS.

SPECIFICATION forming part of Letters Patent No. 765,467, dated July 19, 1904.

Application filed June 24, 1903. Serial No. 162,896. (No model.)

*To all whom it may concern:*

Be it known that I, PERCY FORDER, coachbuilder, a subject of the King of Great Britain, residing at Wolverhampton, in the county of Stafford, England, have invented certain new and useful Improvements in and Relating to the Front Lights for Hansom-Cabs and other Vehicles Requiring Similar Lights, of which the following is a specification.

The front light of a hansom-cab as usually mounted and operated is liable in case of an accident to fall down if in its raised-up or open position and injure the "fare," as it is held up entirely by the strap, which is simply fastened over a button, and an accidental falling of the light may result at any time through the breaking of the strap. Moreover, as the weight of the light when up is borne largely by the strap there is a constant tendency for the strap to stretch, and unless it is taken up at frequent intervals the light will hang down at its inner edge to an extent which is inconvenient to the fare, and, further, a front light formed with an upper and lower division, as is usual, has the upper division hinged to the head, and in opening the light the lower division is (according to the method ordinarily now in use) first drawn up along or against the upper division, and then the upper division is turned up on its hinge under the roof. This arrangement is subject to the inconvenience that an inexperienced fare is liable to sit or lean unduly forward as the light is being operated and be struck by the inner edge of the light, more especially as it is being lowered down, and, further, if the horse should fall down there is a liability that the fare will be thrown forward or upward. In the former case there is risk that in trying to save himself he will thrust his hand through the glass of the lower division of the light if the light is down, and in the latter case there is risk that his head will come against and break the glass of such division if the light is up, and, still further, in the divided lights above referred to the upper division cannot be opened without first opening the lower division.

Now this invention has for its chief objects to mount the front light of a hansom-cab or similar light—such as the front light of a motor-car having a body of the hansom-cab type—in such manner that when in its open position it lies snugly under the roof of the cab and is securely retained in such position independently of the strap by which it is drawn up and is not liable, therefore, to fall through the strap giving way or to hang down as a result of the strap stretching, and to effect the retention of the light in a manner which otherwise renders it peculiarly secure against accidentally falling, and to mount a front light formed with an upper and lower division and operate the same in a manner which avoids turning the light upon a hinge and moving the lower edge thereof within the cab in a manner likely to cause inconvenience to a fare, however inexperienced, and to provide means to guard against the glass of the lower division of the light being broken in case of the fare being thrown forward or upward, and to enable the upper division of a divided light to be opened without opening the lower division.

The above objects are accomplished according to this invention in the manner I will now proceed to describe, with reference to the accompanying drawings, of which—

Figure 2:
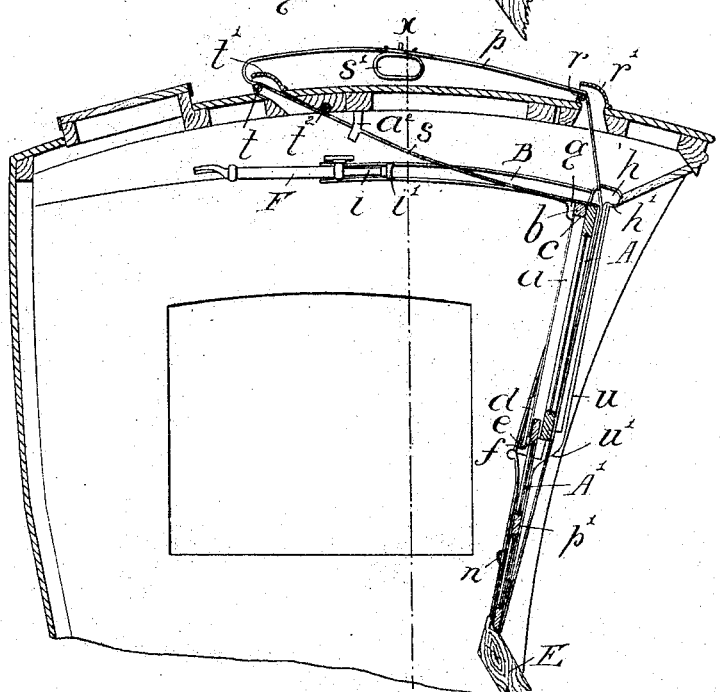
Figure 4:
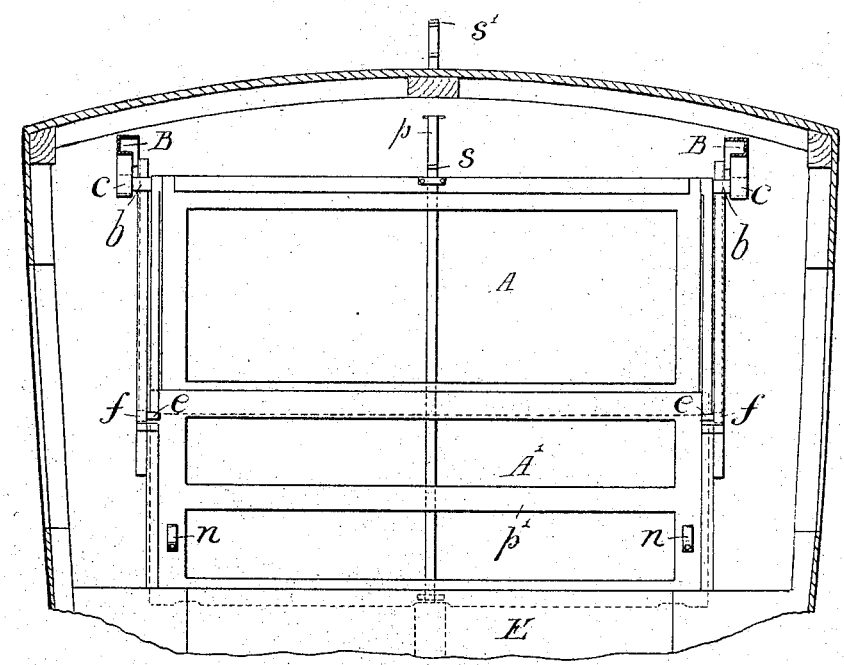
Figure 3:
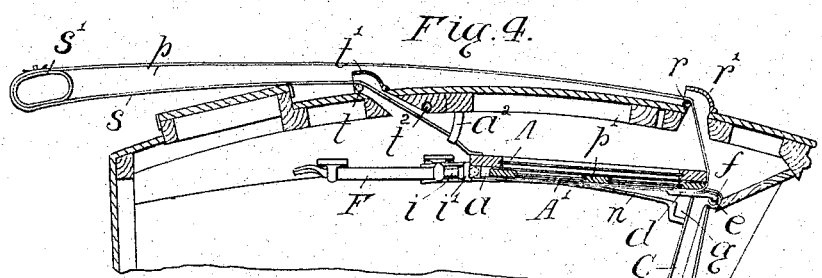
Figure 5:
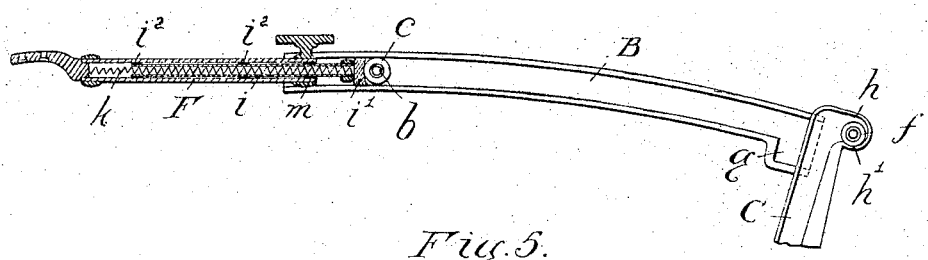
Figure 6:
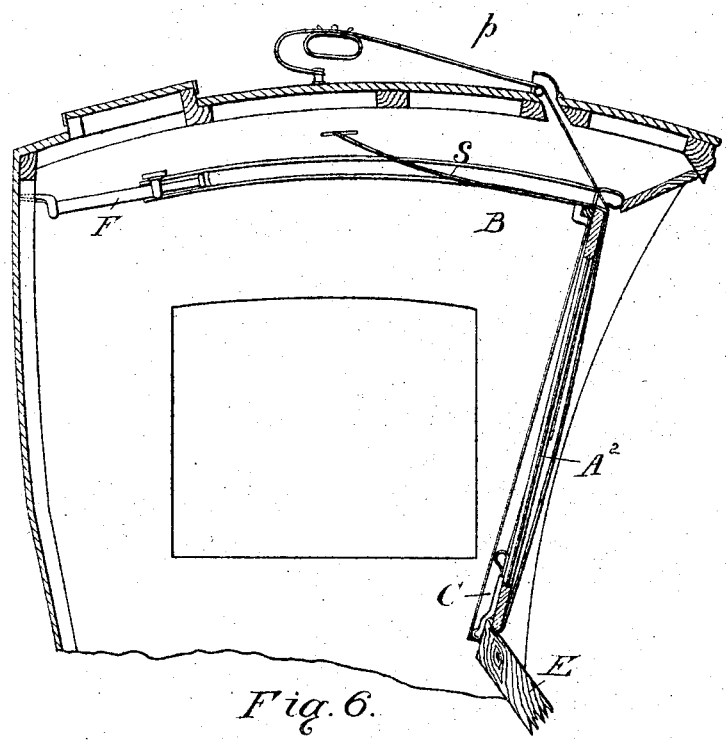
Figures 9, 10:
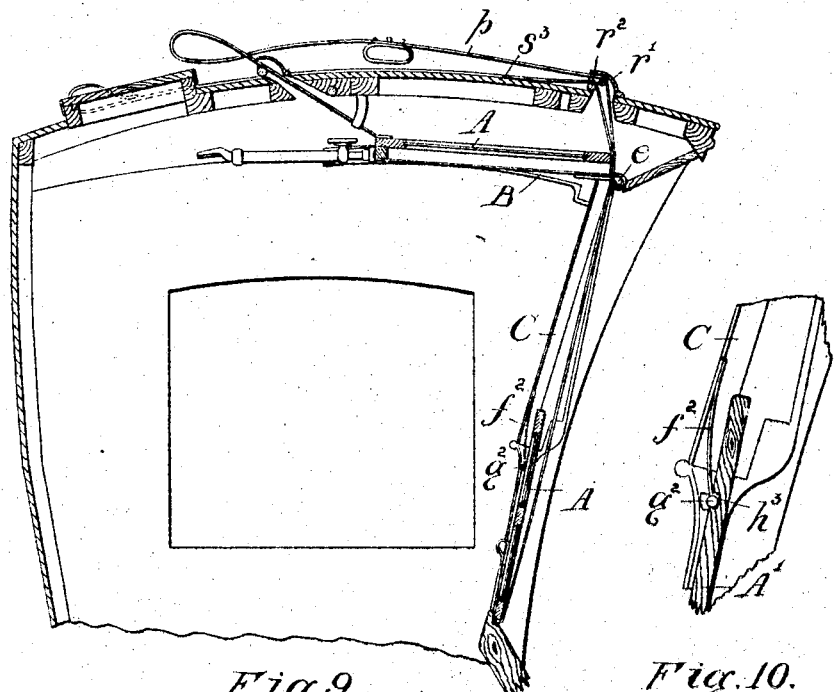
Figure 7:
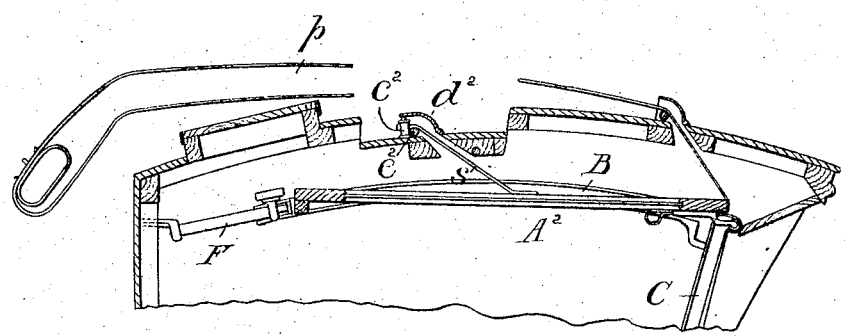
Figure 8:
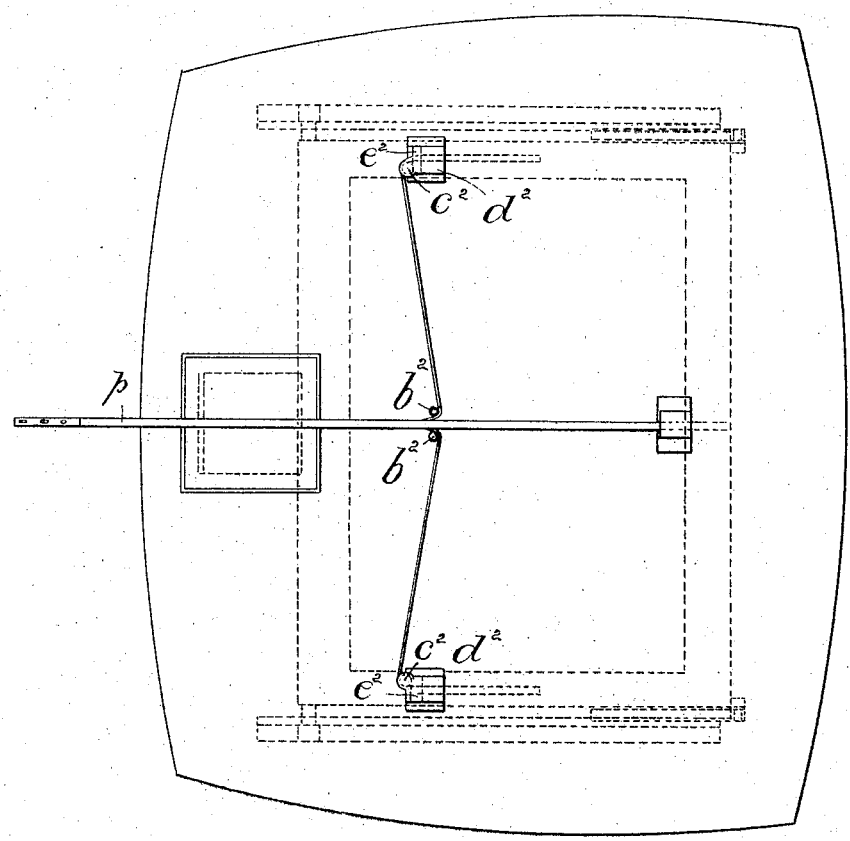

Figure 1 is a longitudinal section through the middle of the upper portion of a hansom-cab body, showing a front light divided into an upper and lower portion, as is usually required, and mounted in the manner of this invention, the light itself being shown intermediate its opened and closed positions. Fig. 2 is a corresponding view to Fig. 1, but shows the light in its closed position. Fig. 3 is a corresponding view to Fig. 1, but shows the light in its upward or completely-open position, and in this view only the portion of the body extending from the top thereof to a short distance below the light when in its raised position is shown. Fig. 4 is a transverse section through the upper portion of the body, taken in the plane indicated by line *x x* of Fig. 2 looking toward the front light, which is shown also in this figure as closed. Fig. 5 is a detail view to an enlarged scale, showing one of the longitudinal guides, hereinafter described, and the upper portion of one of the vertical guides in side elevation and the spring appliance, hereinafter described, in longitudinal section. Fig. 6 is a view corresponding to Fig. 2, illustrating the application of the invention in the case of the front light being formed in a single piece, the light being shown in its closed position. Fig. 7 is a view corresponding to Fig. 3, illustrating the single light shown by Fig. 6 as in its open position. Fig. 8 is a plan view of the arrangement shown by Fig. 7. Fig. 9 is a view illustrating a modification of the invention in which the upper division of a divided light can be opened, leaving the lower division down; and Fig. 10 is an enlarged reproduction of a portion of Fig. 9.

Referring first to the arrangement shown by Figs. 1 to 5, inclusive, the upper division A of the light is formed along the side edges of its rear face with guides $a$, into which the lower division A' of the light may be drawn up in the manner now common with these lights. Studs $b$ project sidewise from the upper portion of the upper division of the light, at the rear face thereof, as shown, and carry on their outer ends rollers $c$, preferably of rubber, which are adapted to roll along curved guides B, which are fixed near the opposite sides, respectively, of the cab a short distance beneath the roof. Brackets $d$ are fixed to the lower portions of the guides $a$ and carry at their lower extremities studs $e$, which carry at their outer ends rollers $f$. These rollers are adapted to roll within guides C, which are formed at the sides of the front openings of the cab and incline somewhat from the vertical in a forward direction. The forward ends of the guides B are formed with depressions or pockets $g$ in their lower sides, into which the rollers $c$ of the upper division A of the light fall as the light closes in and upon the bottoms of which this division of the light then hangs. The pockets prevent the rollers from moving forward or backward when they are down therein, and thus hold the upper part of the division A of the light secure in its closed position, while the rollers $f$ within the guides C securely keep the lower part of the division A in position when closed. The vertical guides C are formed at their upper ends with turnouts or pockets $h$ at their forward sides, into which the rollers $f$ of the upper division of the light pass when the light is in its open position and prevent it from falling. When the upper division A of the light is in its closed position, as shown by Figs. 2 and 4, the lower division A' may pass down into guides D, as in the case of the front lights ordinarily used, and rest as usual upon the top of the doors E.

In each side of the cab and adjacent to the rear ends of the guides B, respectively, are fixed tubular cases F, within each of which slides a tube $i$, formed at its outer end with a head $i'$, and between the closed rear end of the tube F and the head $i'$ is inserted a spiral spring $k$, which passes through the tube $i$. The tube $i$ has an external diameter somewhat smaller than the internal diameter of the tube F; but has two bands $i^2$ therearound, which are just an easy sliding fit within the tube F. A band $m$ is formed around the inside of the front end of the tube F, and the forward band $i^2$ coming against the band $m$ forms a stop to the action of the spring in moving the tube $i$ outward.

In opening the light from its closed position (shown by Fig. 2) into its open position (shown by Fig. 3) the lower division A' of the light is first slid up the guides $a$ of the upper division A, and then the two divisions of the light are together moved upward to bring the rollers $c$ out of the pockets $g$, and their upper sides are then moved backward, thus running the rollers $c$ along the guides B and passing the light into its position shown by Fig. 1 and backward from such position until the studs $b$, which are preferably surrounded with rubber or other soft material, come, respectively, against the heads $i'$ of the sliding tubes $i$ and as the light is still farther moved back compress the springs $k$ until the rollers $f$ have come opposite the pockets $h$ in the upper ends of the guides C, at which stage the light is allowed to be pressed forward by the reaction of the springs $k$ and brings the rollers $f$ into the pockets $h$. The light is then securely held up in its open position simply by the rollers $c$ within the guides B, the rollers $f$ within the pockets $h$, and the springs $k$, which prevent the light shaking back and withdrawing the rollers $f$ from the pockets $h$, and it will be seen that any sudden jerk forward, such as by the falling of the horse, has no tendency to shake the rollers $f$ out of the pockets $h$, but rather the reverse tendency. As additional security the lower side $h'$ of each pocket $h$ is preferably somewhat recessed, as shown, so that the weight of the light tends itself to keep the rollers $f$ within the pockets. The recessing of the lower sides of these turnouts may be such as to insure the retention of the rollers $f$ therein if the same are moved into the turnouts simply by hand or by other means which are not used also to retain them therein, and in such an arrangement the springs would be unnecessary.

The light is closed by precisely the reverse series of operations to those by which it is opened, as will be obvious.

The opening and closing of the light may be performed by the fare by means of leather loops $n$ or the like fastened to the lower division of the light or by the driver through the medium of straps or the like.

To enable the light to be opened by the driver, a strap $p$ passes from near the driver's seat $B^2$ over the roof of the cab through an opening through the roof, over the front upper edge of the light when the same is closed down across the face of the upper division of the light, and thence down to the lower front edge of the bottom division of the light, where it is attached thereto. The strap passes over a roller $r$ in a bonnet $r'$, fixed upon the roof of the cab, down to the top front corner of the upper division of the light, and this roller is situated some distance back from the plane of the light to insure that when the strap is tightened pressure will be exerted against the upper edge of the light in a direction tending to press it backward. The first effect of pulling back the strap is to draw up the lower division of the light into the guides $a$ of the upper division and then to raise the two divisions of the light together, and thus to raise the rollers $c$ out of the pockets $g$. Immediately the rollers have thus been raised clear of the pockets the pressure of the strap against the upper edge of the light moves it backward, causing the rollers $c$ to run along the guides B, and the pull on the strap being continued the light is brought into position with the rollers $c$ in their farthest position backward within the guides B (thus compressing the springs $k$) and the rollers $f$ opposite the pockets $h$. Immediately the rollers $f$ come opposite to the pockets $h$ the reaction of the springs $k$ tending to force forward the light engages the rollers $f$ with the pockets $h$, and the light is thus secured in its open position. It will be observed that by the time the upper portion of the light has been moved back as far as it can be by the pressure of the strap against the upper edge thereof the portions of the guides B which the rollers $c$ have then reached are at such angles with the plane of the light that the further pull of the strap will still insure that the rollers will run back along the guides.

To enable the light to be closed by the driver, a strap $s$ passes from near its seat $B^2$ over a roller $t$, carried by a bonnet $t'$, fixed upon the roof of the cab, thence through an opening in the roof under a roller $t^2$, carried inside the roof, and thence through a guide $a^2$ to the upper side of the upper division of the light. The driver pulls back this strap, and thereby withdraws the rollers $f$ from the pockets $h$, and immediately these rollers are clear of the pockets they will run down the guides C, and if the strap $s$ is released the upper light will fall into its closed position by its own gravity, the rollers $c$ running forward along the guides B and dropping into the pockets $g$ at the forward ends thereof, and when the upper division of the light is in place the lower division will run down by gravity into the guides D and rest upon the tops of the doors E. The lowering of the light, however, should be checked by means of the strap $p$ to prevent shock. The two straps $p$ and $s$ may be joined together by a loop $s'$, and by passing the hand through this loop both the straps may be readily manipulated as desired without taking a fresh hold.

It will be seen that the guides B fall toward their forward ends and that this formation readily allows the light to be drawn back by the pull of the strap $p$ along such portions of the guides and to pass forward again along such portions by its own gravity in closing. The reaction of the springs $k$ facilitates the initial movement of the light in lowering, as will be obvious.

The lower division of the light is prevented from falling any inconvenient distance in relation to the upper division until the light has been lowered down into position to allow the lower division to run down into the guides D by ledges $u$, running down at opposite sides of the front opening of the cab, against which the lower division of the light will come if it falls in the guides of the upper division, while the said upper division slants forward toward its lower end, and in such case the lower edge of the lower division runs down inclines $u'$ from the lower ends of the ledges $u$ into the open ends of the guides D. Of course if and so long as the light is checked by the strap $p$ while it is lowered the lower division of the light cannot fall in relation to the upper.

A bar $p'$ is formed horizontally across the middle of the lower division of the light as a precaution against the glass in such division being broken by the hand of the fare if he is thrown forward while the light is down or being broken by his head in case he is thrown up while the light is open.

Referring now to the arrangement shown by Figs. 6, 7, and 8, the front light $A^2$, formed in a single piece, is mounted and operated almost precisely as the upper division A, previously described; but in this case the guides B under the roof have to be proportionately longer, as shown, and the spring appliances having the cases F are fixed correspondingly farther back within the cab, and the guides C extend down to the doors E, all as will be obvious. In this modification the strap $s$ is divided, one division passing around a roller $b^2$ to one side of the roof of the cab, thence around a roller $c^2$, mounted vertically in a bonnet $d^2$, and over a roller $e^2$, mounted horizontally in such bonnet, thence through an opening in the roof to one side of the front of the light at a point about midway in the height thereof, where it is securely fastened. The other division of the strap $s$ is correspondingly led to the other side of the front of the light and is fastened thereto. In Fig. 7 the part of the roof which carries the bonnet $d^2$ is shown as if the section were taken through such bonnet instead of through the middle of the roof. The purpose of dividing the strap $s$ and connecting the ends with about the middle of the light is to avoid the quantity of strap which would otherwise be hanging down at the back of the roof if the strap $s$ were connected with the top edge of the light and which would be very inconvenient in manipulation. The strap $p$ passes in this case also down the middle of the front of the light, but is of course fastened to the lower edge of the single light.

Referring now to the arrangement shown by Figs. 9 and 10, the parts are arranged precisely as in the modification shown by Figs. 1 to 5, except that in addition to the strap $p$, by which the lower light A' is first lifted up behind the light A and then the two lights are moved together into their open position under the roof, an independent strap $s^3$ is used, which passes down the middle of the front of the upper division of the light and is fastened to the lower edge thereof, and except for an arrangement to provide against the lower division of the light being mischievously raised after the upper division has been opened, leaving the lower division down. The strap $s^3$ passes over a lower roller $r^2$, mounted within the bonnet $r'$, and by means of this strap the upper division A of the light may be raised into its open position (shown by Fig. 9) just as the single light (shown by Figs. 6, 7, and 8) is raised, leaving the lower division A' in its closed position. (Shown by Fig. 9.) If the strap $p$ is used instead of the strap $s^3$, the lower division A' is first raised up behind the upper division A and then the two lights moved into their open position under the roof just as the two divisions of the light are opened by the arrangement shown by Figs. 1 to 5.

To prevent the lower light A' being mischievously moved up when it has been left down after the upper division has been raised, a spring $f^2$ is arranged in each guide C, and carries at its lower end a head $g^2$, which engages with a notch $h^3$ in the rear face of the division A' when the same is down. When it is desired to open this lower division of the light, the upper division is allowed to close down, and in passing down the rollers $e$ thereof running down the guides C press back the springs $f^2$, and thus clear the heads $g^2$ thereof from the notches $h^3$ of the lower division A'. The two divisions may then be opened by the strap $p$ precisely as the divisions of the light are opened in the modification shown by Figs. 1 to 5.

The light may of course according to either modification shown be opened or closed by the "fare" by means of the straps if the same are brought down inside of the body of the vehicle.

Having fully described my invention, what I claim, and desire to secure by Letters Patent, is—

1. The combination, with the front light of a hansom-cab, or similar light, of upward guides, lower studs projecting from opposite sides of the light which enter the upward guides, turnouts or pockets at the upper ends of said guides, longitudinal guides, upper studs projecting from opposite sides of the light which engage with the longitudinal guides, and spring devices which move said lower studs into said pockets, when the light has been raised into its open position, and retain the studs in such pockets, substantially as set forth.

2. The combination, with the front light of a hansom-cab, or similar light, of upward guides, lower studs projecting from opposite sides of the light which enter the upward guides, turnouts or pockets at the forward sides of the upper ends of said guides, longitudinal guides, upper studs projecting from opposite sides of the light which engage with the longitudinal guides, and means by which the lower studs may be engaged with the said turnouts or pockets, when the light has been raised into its upward position, substantially as set forth.

3. The combination, with the front light of a hansom-cab, or similar light, of upward guides, longitudinal guides, upper and lower studs projecting from opposite sides of the light which engage with the guides, and downward recesses into which a pair of said studs pass from their respective guides as the light assumes its normal open position and which prevent endwise movement of the light, substantially as set forth.

4. The combination, with the front light of a hansom-cab, or similar light, of upward guides, lower studs projecting from opposite sides of the light which enter the upward guides, turnouts or pockets at the upper ends of said guides, recesses in the lower sides of such turnouts or pockets, longitudinal guides, and upper studs projecting from opposite sides of the light which engage with the longitudinal guides, substantially as set forth.

5. The combination, with the front light of a hansom-cab, or similar light, of upward guides, lower studs projecting from opposite sides of the light which enter the upward guides, turnouts or pockets at the upper ends of such guides, longitudinal guides, upper studs projecting from opposite sides of the light which engage with the longitudinal guides, and spring devices in positions adjacent to the rear ends of the longitudinal guides, which are compressed by the light as it reaches its open position, and the reaction of which pushes forward the light and engages the lower studs with the pockets and retains them therein, substantially as set forth.

6. The combination, with the front light of a hansom-cab, or similar light, of upward guides, lower studs projecting from opposite sides of the light which enter the upward guides, turnouts or pockets at the upper ends of such guides, longitudinal guides, upper studs projecting from opposite sides of the light which engage with the longitudinal guides, and spring devices in positions adjacent to the rear ends of the longitudinal guides, which are compressed by the light as it reaches its open position, and the reaction of which pushes forward the light and engages the lower studs with the pockets and retains them therein, and means for disengaging the lower studs from such pockets by the driver, substantially as set forth.

7. The combination with the front light of a hansom-cab, or similar light, of upward guides, lower studs projecting from opposite sides of the light, which enter said guides, turnouts or pockets at the upper ends of such guides, spring devices which move said studs into such pockets and retain them therein when the light is open, longitudinal guides, upper studs projecting from opposite sides of the light which enter the longitudinal guides, and turnouts or pockets in the forward ends of such longitudinal guides into which the upper studs fall as the light is lowered into position, substantially as set forth.

8. The combination, with the front light of a hansom-cab, or similar light, of upward guides, lower studs projecting from opposite sides of the light which enter said guides, turnouts or pockets at the upper ends of said guides, longitudinal guides, upper studs projecting from opposite sides of the light which engage with the longitudinal guides, spring devices which move said lower studs into said pockets, when the light has been raised into its upward position, and retain the studs in such pockets, and a flexible connector by which the light may be opened, substantially as set forth.

9. The combination, with the front light of a hansom-cab, or similar light, of upward guides, lower studs projecting from opposite sides of the light which enter said guides, turnouts or pockets at the upper ends of said guides, longitudinal guides, upper studs projecting from opposite sides of the light which engage with the longitudinal guides, spring devices which move said lower studs into said pockets, when the light has been raised into its upward position and retain the studs in such pockets, a flexible connector by which the light may be opened, and a flexible connector by which the light may be pulled in a direction to disengage the lower studs from said pockets, substantially as set forth.

10. The combination with the upper and lower divisions of the front light of a hansom-cab, or similar light, of guides on the upper division to receive and carry the lower division when the latter moves upward in opening, upwardly-extending lateral guides at the respective sides of the opening closed by the light, laterally-projecting studs carried by the upper division of the light at its lower part and engaging the respective upwardly-extending lateral guides aforesaid, upper longitudinally-extending guides near the roof, laterally-projecting studs carried by the upper division of the light at its upper part and engaging the respective upper guides, and means for first drawing up the lower division of the light into its guides on the upper division, and then drawing up the connected divisions together, the upper division carrying the lower in its movement.

11. The combination, with the front light of a hansom-cab, or similar light, of upward guides, lower studs projecting from opposite sides of the light which enter said guides, turnouts or pockets at the upper ends of said guides, longitudinal guides, upper studs projecting from opposite sides of the light which engage with the longitudinal guides, spring devices which press said lower studs into said pockets, when the light has been raised into its upward position, and retain the studs in such pockets, a flexible connector by which the light may be opened, and a flexible connector by which the light may be pulled in a direction to disengage the lower studs from said pockets and which passes through openings in the roof near to opposite sides thereof, respectively, and is connected at its ends with the front of the light near to the sides thereof, respectively, in positions which are intermediate the top and bottom of the light, being approximately half-way between, substantially as set forth.

12. The combination, with the front light of a hansom-cab, or similar light, said light being divided into upper and lower portions of which the lower portion is capable of being drawn up within guides of the upper portion, of upward guides, lower studs projecting from opposite sides of the light, which enter said guides, turnouts or pockets at the upper ends of said guides, longitudinal guides, upper studs projecting from opposite sides of the light, which engage with the longitudinal guides, and means by which such lower studs may be engaged with said turnouts or pockets to retain the light in its open position; substantially as set forth.

13. The combination, with the front light of a hansom-cab, or similar light, said light being divided into upper and lower portions of which the lower portion is capable of being drawn up within guides of the upper portion, of upward guides, lower studs projecting from opposite sides of the light which enters said guides, turnouts or pockets at the upper ends of such guides, longitudinal guides, upper studs projecting from opposite sides of the light which engage with the longitudinal guides, and spring devices which move said lower studs into said pockets, when the light has been raised into its upward position, and retain the studs in such pockets, substantially as set forth.

14. The combination, with the front light of a hansom-cab, or similar light, said light being divided into upper and lower portions of which the lower portion is capable of being drawn up within guides of the upper portion, of upward guides, lower studs projecting from opposite sides of the light which enter said guides, turnouts or pockets at the upper ends of said guides, longitudinal guides, upper studs projecting from opposite sides of the light which engage with the longitudinal guides, spring devices which move said lower studs into said pockets, when the light has been raised into its upward position, and retain the studs in such pockets, a flexible connector by which in opening the light the lower division thereof is first pulled up within the guides of the upper division and then the two divisions drawn up together, substantially as set forth.

15. The combination, with the front light of a hansom-cab, or similar light, said light being divided into upper and lower portions of which the lower portion is capable of being drawn up within guides of the upper portion, of upward guides, lower studs projecting from opposite sides of the light which enter said guides, turnouts or pockets at the upper ends of said guides, longitudinal guides, upper studs projecting from opposite sides of the light which engage with the longitudinal guides, spring devices which move said lower studs into said pockets, when the light has been raised into its upward position, and retain the studs in such pockets, a flexible connector by which in opening the light the lower division thereof is first pulled up within the guides of the upper division and then the two divisions drawn up together, and a flexible connector by which the light may be pulled up in a direction to disengage the lower studs from said pockets, substantially as set forth.

16. The combination, with the front light of a hansom-cab, or similar light, said light being divided into upper and lower portions of which the lower portion is capable of being drawn up within guides of the upper portion of a flexible connector, which is connected with the upper division of the light, and by which the upper division of the light may be drawn up leaving the lower division down, and a flexible connector, which passes down across the front face of the upper division when the light is closed, and is connected with the bottom of the lower division, and by which the lower division may be first pulled up within the guides of the upper division and then the two divisions be drawn up together, substantially as set forth.

17. The combination, with the front light of a hansom-cab, or similar light, said light being divided into upper and lower portions of which the lower portion is capable of being drawn up within guides of the upper portion, of means by which the upper division of the light may be drawn up leaving the lower division down, and spring devices which engage with the lower division when the upper division has been drawn up, leaving the lower division down, and which are moved out of engagement therewith as the upper division is lowered down again into its closed position, substantially as set forth.

In witness whereof I have hereunto signed my name, this 11th day of June, 1903, in the presence of two subscribing witnesses.

PERCY FORDER.

Witnesses:
  ROBERT G. GROVES,
  ALFRED H. WATKINS.